United States Patent
Graf

(10) Patent No.: US 10,415,521 B2
(45) Date of Patent: Sep. 17, 2019

(54) DELIVERY DEVICE FOR DELIVERING AND HEATING A MEDIUM

(71) Applicant: CONTINENTAL AUTOMOTIVE GmbH, Hannover (DE)

(72) Inventor: Rolf Graf, Glashütten (DE)

(73) Assignee: Continental Automotive GmbH, Hannover (DE)

(*) Notice: Subject to any disclaimer, the term of this patent is extended or adjusted under 35 U.S.C. 154(b) by 0 days.

(21) Appl. No.: 15/538,168

(22) PCT Filed: Dec. 16, 2015

(86) PCT No.: PCT/EP2015/079920
§ 371 (c)(1),
(2) Date: Jun. 20, 2017

(87) PCT Pub. No.: WO2016/102257
PCT Pub. Date: Jun. 30, 2016

(65) Prior Publication Data
US 2017/0363050 A1 Dec. 21, 2017

(30) Foreign Application Priority Data

Dec. 22, 2014 (DE) ................ 10 2014 226 835

(51) Int. Cl.
| | | |
|---|---|---|
| *F02M 37/08* | (2006.01) | |
| *F02D 41/30* | (2006.01) | |
| *H02K 23/66* | (2006.01) | |
| *H02K 7/14* | (2006.01) | |
| *F01N 3/20* | (2006.01) | |
| *F02D 41/26* | (2006.01) | |
| *F02M 31/125* | (2006.01) | |

(52) U.S. Cl.
CPC ............. *F02M 37/08* (2013.01); *F01N 3/20* (2013.01); *F02D 41/26* (2013.01);
(Continued)

(58) Field of Classification Search
CPC ...... F02M 37/08; F02M 37/223; F02M 37/10; F02M 31/125; F02M 31/02; F02M 31/16;
(Continued)

(56) References Cited

U.S. PATENT DOCUMENTS 3,669,081 A * 6/1972 Monpetit ............ F02D 41/3082
123/179.17
4,600,821 A   7/1986 Fichtner et al.
(Continued)

FOREIGN PATENT DOCUMENTS

DE         36 39 719     6/1988
DE   10 2010 027 838    10/2011
(Continued)

*Primary Examiner* — Lindsay M Low
*Assistant Examiner* — George C Jin
(74) *Attorney, Agent, or Firm* — Cozen O'Connor

(57) ABSTRACT

A delivery device for delivering a medium and for heating the medium to be delivered, having a vehicle pump, an electric motor for driving the vehicle pump and a control unit for controlling the electric motor. For heating the medium in the vehicle pump, the control unit is designed to generate a first alternating electrical current in a conductor winding of the electric motor. This first alternating electrical current induces eddy currents in a component of the delivery device, by which the medium can be heated.

9 Claims, 2 Drawing Sheets

(52) U.S. Cl.
CPC ....... *F02D 41/3082* (2013.01); *F02M 31/125* (2013.01); *H02K 7/14* (2013.01); *H02K 23/66* (2013.01); *F01N 2610/02* (2013.01); *F01N 2610/144* (2013.01); *F02D 2200/0606* (2013.01); *F02M 2037/085* (2013.01); *Y02T 10/126* (2013.01)

(58) Field of Classification Search
CPC .............. F02M 2037/085; F02D 41/26; F02D 41/3082; F02D 41/064; F01N 2610/144; F01N 2610/02
See application file for complete search history.

(56) References Cited

U.S. PATENT DOCUMENTS

| | | | |
|---|---|---|---|
| 4,890,988 A | 1/1990 | Krämer et al. | |
| 4,934,907 A * | 6/1990 | Kroner | F02M 31/125 123/557 |
| 5,159,915 A * | 11/1992 | Saito | F02M 31/125 123/538 |
| 8,714,942 B2 * | 5/2014 | Lutoslawski | B60K 25/02 417/319 |
| 2008/0216799 A1* | 9/2008 | Wunderlich | F02D 41/3082 123/497 |
| 2010/0299052 A1* | 11/2010 | Sturman | F02D 41/064 701/113 |
| 2013/0108476 A1* | 5/2013 | Guzelgunler | F04B 49/065 417/53 |

FOREIGN PATENT DOCUMENTS

| | | | | |
|---|---|---|---|---|
| DE | 10 2010 035 039 | | 2/2012 | |
| DE | 102010035039 a1 * | | 2/2012 | ............ F02D 13/06 |
| EP | 0 087 727 | | 9/1983 | |
| WO | WO 2012/116016 | | 8/2012 | |

* cited by examiner

DELIVERY DEVICE FOR DELIVERING AND HEATING A MEDIUM

CROSS REFERENCE TO RELATED APPLICATIONS

This is a U.S. national stage of application No. PCT/EP2015/079920, filed on Dec. 16, 2015. Priority is claimed on German Application No. DE102014226835.4, filed Dec. 22, 2014, the content of which is incorporated here by reference.

BACKGROUND OF THE INVENTION

1. Field of the Invention

The invention relates to a delivery device for delivering a medium and for heating the medium for delivery, to a vehicle, to a method, to a program and to a computer-readable medium.

2. Description of the Related Art

Conventionally, typical fuel pumps for diesel may have a pump mechanism that operates in accordance with the positive-displacement principle. An example of this is the gerotor pump mechanism. Furthermore, screw pumps or roller cell pump mechanisms may also be used for fuel pumps. It is likewise possible for urea solution pumps, which are used for exhaust-gas aftertreatment, to have a pump mechanism that operates in accordance with the positive-displacement principle. During the operation of these pumps, various operating states can arise in a manner dependent on the pressure and viscosity of the delivered medium. Since a pump mechanism that operates in accordance with the positive-displacement principle must exhibit high hydraulic stiffness, a change in the viscosity or of the pressure of the delivered medium can have a direct effect on the torque required for driving the pump mechanism.

Diesel fuel normally has the characteristic whereby, when a certain temperature is undershot, paraffins can precipitate in the form of flakes in the fuel. Thus, if the temperature of the diesel fuel becomes low enough, this mechanism can lead to thickening and thus increasing solidification of the fuel. Here, the viscosity of the diesel fuel can greatly increase, and non-linear or rheolinear viscosity characteristics can arise. Beyond a certain change in the viscosity, normal pump running can, for the stated reasons, be impeded or rendered impossible, which in the case of a pump driven by an electrically commutated electric motor can be manifested in repeated unsuccessful starts. The same mechanisms may in principle also apply to pumps for urea solutions which, for the exhaust-gas aftertreatment of diesel vehicles, are dosed into the exhaust tract. The urea solutions used in motor vehicles can freeze at temperatures of approximately −8 to −11° C. For the delivery of diesel fuel and urea solutions, it may be necessary to ensure high availability of the vehicle or correct exhaust-gas aftertreatment even in the presence of very cold temperatures.

SUMMARY OF THE INVENTION

The object of the invention can be regarded as being that of increasing the reliability of pumps in vehicles.

A first aspect of the invention relates to a delivery device for delivering a medium and for heating the medium for delivery, which delivery device has a vehicle pump, an electric motor for driving the vehicle pump, and a controller, also referred to as a control unit having a microprocessor and memory for controlling the electric motor. Furthermore, the electric motor has at least one conductor winding. Furthermore, the controller is designed to generate a first electrical alternating current with a first frequency in the at least one conductor winding. Due to the first electrical alternating current generated in the at least one conductor winding, eddy currents are induced in a component of the delivery device for the purposes of heating the medium. This can be understood to mean that the controller is designed to generate a first electrical alternating current with a first frequency in the at least one conductor winding, in such a way that eddy currents can be induced in a component of the delivery device.

In other words, a concept of the present invention can consist in not only the windings of the electric motor but also other components of the delivery device, for example the iron of the lamination assemblies of the electric motor as a whole, for example the stator and/or possibly the rotor of the electric motor, being heated. This can be realized through the introduction of high-frequency currents into the conductor winding of the electric motor. To heat the component of the delivery device, the conductor winding can have alternating currents of relatively high frequency applied to it. In this way, high-frequency magnetic fields can form in the component, which magnetic fields can lead to corresponding eddy currents in the component and to corresponding heat generation. The required alternating currents can be relatively small in relation to a direct-current heating configuration, because the heating of the component can be generated by remagnetization losses in the component itself and do not have to be generated by the ohmic resistance of the conductor winding. It is thus possible for any plug contacts of connection plugs and a possible output stage of the control unit to be of smaller and less expensive design. Furthermore, the electrical power that can be introduced into the pump in this way without damage can be considerably greater than that in the case of heating of the winding by direct currents. The medium situated in the pump can thus be liquefied more quickly. Since the thermal resistance of the pump as a whole with respect to the surroundings and with respect to the medium situated in the pump interior can be lower in relation to a single winding, it is also possible for the surroundings of the pump to be heated more effectively, whereby a certain reservoir of liquid medium can be obtained.

In this way, the medium situated in the pump can be heated more quickly, whereby the reliability of the delivery device can be increased.

Here, in the context of the present invention, the expression "delivery device" can be understood in a broad sense. The delivery device thus need not imperatively be a single structural unit. For example, the vehicle pump, the electric motor and the controller may be different structural units. The control unit may for example be part of the engine controller. The medium for delivery may for example be fuel, diesel fuel, window washer fluid, urea and/or engine and/or gearbox oil. In general, the medium may be a medium in the case of which solidification of the medium can be expected at a certain temperature. The vehicle pump may refer to various pump types. For example, the vehicle pump may be realized as a flow pump, a gerotor pump, a screw pump, or a roller cell pump. That is to say, the present invention can be applied to various pump types. In the context of the present invention, a vehicle pump can be understood to mean a pump which can be used in the automotive sector. The electric motor may for example denote a mechanically commutated or an electrically commutated electric motor. In the case of the electrically commutated electric motor, the controller may for example simultaneously be a regulation unit that regulates the current supply to the electric motor for the drive of the electric motor. The conductor winding of the electric motor may for example be attached to the rotor or to the stator of the electric motor. This may be dependent on the exact manner in which the electric motor is constructed. For example, in the case of an electrically commutated electric motor, the conductor winding may be arranged on the stator, whereas, in the case of a mechanically commutated electric motor, the conductor winding may be attached to the rotor. Furthermore, it is also possible for multiple conductor windings to be arranged in the electric motor. The first electrical alternating current that is generated in the at least one conductor winding may be a high-frequency electrical alternating current. Said high-frequency alternating current can in turn generate high-frequency magnetic fields in the component of the delivery device. Said component may for example be an iron component or a lamination assembly of the electric motor. This is for example the stator or possibly the rotor of the electric motor. Furthermore, it is also possible for separate components, which are designed to be heated by the generated eddy currents, to be attached outside the electric motor. Said components may be constructed specifically for this purpose.

In modern motor vehicles, fuel and/or urea solution pumps may typically be designed as pumps that are driven by electrically commutated electric motors. The electronic controller and/or regulator of the electric motor can furthermore detect blockage of the pump.

The heating may be performed until the medium in the pump and in the direct vicinity of the pump is liquefied. Here, the heating may be dependent on ambient conditions. Furthermore, the medium may be heated until the temperature thereof is a few degrees above the solidification point of the medium. Here, the extent of the heating, or the attained temperature of the medium, may be dependent on the time duration of the heating operation.

The first electrical alternating current or the heating currents may furthermore be of similar magnitude to the normal operating currents for the drive of the electric motor, hereinafter referred to as second electrical alternating current. The dimensioning of the contacts and of the power electronics of the electric motor can thus remain the same for the generation of the heating currents and of the operating currents, because there is no need here for loads to arise which are significantly higher than those in normal operation.

In an exemplary embodiment of the invention, the first electrical alternating current is configured to generate in the electric motor a magnetic field, which is not a rotating field.

Here, the magnetic field may be generated by the first electrical alternating current in the at least one conductor winding. Furthermore, a rotating field may be understood to mean a magnetic field that rotates about an axis of rotation. In other words, this may mean that the magnetic field generated by the first alternating current does not rotate, or rather, this may mean that the first electrical alternating current does not generate a drive torque for the electric motor. For example, the first electrical alternating current does not have to be applied in a block pattern. For example, an alternating voltage may be applied to one or more conductor windings, which alternating voltage drives an alternating current through said conductor winding or conductor windings. The field generated in the interior may in this case be a purely alternating field without a rotating component. Here, the rotor may be static, or need not rotate. By virtue of the fact that, in this case, the first electrical alternating current does not generate any drive torque, the medium can be heated without the electric motor being driven.

In an exemplary embodiment of the invention, the electric motor has a rotor and a stator, wherein the at least one conductor winding is arranged on the stator. By the first electrical alternating current generated in the at least one conductor winding, eddy currents are induced in the stator of the electric motor. In other words, by the first electrical alternating current generated in the at least one conductor winding, eddy currents can be induced in the stator of the electric motor.

Here, the electric motor may for example be an electrically commutated electric motor. In this case, the control unit may be realized in the electronics required for the electrically commutated electric motor. In this way, no additional components are required for the delivery device, whereby the delivery device according to the invention is easy to realize, can be easily retrofitted and can be operated in a reliable manner, because, owing to the smaller number of components, the likelihood of failure can be reduced. Furthermore, the delivery device can also be produced inexpensively.

In a further exemplary embodiment of the invention, the control unit is furthermore designed to generate a second electrical alternating current with a second frequency in the at least one conductor winding for the purposes of driving the electric motor, wherein the second electrical alternating current generates a rotating field in the electric motor.

Here, a rotating field may be understood to mean a magnetic field that rotates about an axis of rotation, for example about the drive axis of the electric motor. In other words, a drive torque can be generated by the second electrical alternating current. Through the provision of the control unit that can simultaneously generate currents for heating and for drive purposes, a simple solution is provided for delivering and heating the medium situated in the delivery device. Furthermore, said delivery device can be easily retrofitted with the heating functionality, and can also be more reliable, because no extra components are required, which could result in increased likelihood of failure.

In a further exemplary embodiment of the invention, the control unit is designed to generate the first electrical alternating current in the at least one conductor winding with the first frequency, which amounts to between 500 Hz and 50 kHz.

Here, the frequency of the first electrical alternating current may be dependent on the design of the delivery device, for example on the lamination thickness and possibly the actuation pattern of multiple conductor windings. Since the heating can be generated by eddy currents induced in the iron, the electric motor can, for heating purposes, have voltages and currents applied to it which are similar to those during normal operation. For typical motor-vehicle pumps, the voltage may be 12 V and the currents may amount to 8 to 20 A. The losses for the heating of the medium may then arise owing to the relatively high eddy currents in the iron resistance. This may involve a transformer effect, in the case of which a high secondary current can generate ohmic losses. Here, the primary winding may conduct only a relatively small current and may thus exhibit low ohmic losses. Furthermore, for heating purposes, alternating currents are applied which have a frequency above the range of human hearing. In this way, generation of noise by the delivery device can be prevented. However, if a first alternating current within the frequency range of human hearing is necessary, for example owing to the impedance profile of the winding inductance, the frequency may be selected such that the generation of noise is minimized.

In a further exemplary embodiment of the invention, the delivery device has a temperature sensor for measuring a temperature of the medium for delivery. Furthermore, the control unit is designed to generate the first electrical alternating current in the at least one conductor winding if the temperature measured by the temperature sensor differs from a predefined temperature threshold value.

The temperature sensor may for example be arranged in the pump or in a feed line or discharge line of the pump. In this case, a temperature of the delivered medium can be measured by the temperature sensor. Furthermore, the temperature sensor may also be arranged in the control unit. In this case, the temperature sensor can measure the ambient temperature. Furthermore, the temperature sensor may also be part of the electronics of the electric motor, in order to detect the internal temperatures in the apparatus. The temperature threshold value may for example denote a threshold value, in the event of the undershooting of which the viscosity of the medium becomes too high owing to the temperature of the medium. If blockage of the pump is detected in the presence of a simultaneously low ambient temperature, the blocking may have been caused by a solidified medium. In this way, the delivery device can impart a heating action when a risk of blockage of the vehicle pump exists owing to an excessively high viscosity of the medium.

In a further exemplary embodiment of the invention, the delivery device has a temperature sensor for measuring a temperature of the medium for delivery. Furthermore, the control unit is designed to detect a blockage of the electric motor. Furthermore, the control unit is designed to generate the first electrical alternating current in the at least one conductor winding if the control unit detects the blockage of the electric motor and the temperature of the medium for delivery as measured by the temperature sensor falls below the predefined temperature threshold value.

In this way, in the event of a blockage of the vehicle pump, the medium in the vehicle pump can be automatically heated again, whereby normal operation of the vehicle pump can be quickly restored. Furthermore, the heating of the medium may also be performed before the use of the vehicle pump, for example if the medium in the vehicle pump is at a relatively low temperature.

A second aspect of the invention relates to a vehicle having a delivery device described in the context of the present invention, wherein the vehicle pump is a fuel pump for delivering fuel for an internal combustion engine or a urea solution pump.

Since the delivery device is one as described in the context of the present invention, features and advantages mentioned in conjunction with the delivery device are also applicable to the vehicle. The vehicle may for example be a passenger motor vehicle or a heavy goods motor vehicle driven by an internal combustion engine. The vehicle may furthermore also be equipped with a hybrid drive.

A third aspect of the invention relates to a method for heating a medium for delivery by a delivery device, which has a vehicle pump, driven by an electric motor, for delivering the medium. Here, the method has the step of generating a first electrical alternating current with a first frequency in at least one conductor winding of the electric motor. By the first electrical alternating current generated in the at least one conductor winding, eddy currents are induced in a component of the delivery device, whereby the medium is heated.

The method may for example be carried out in a controller of a delivery device described in the context of the present invention. Therefore, features and advantages mentioned in conjunction with the delivery device are also applicable to the method. Furthermore, the steps of the method may be carried out in different sequences and/or in parallel.

A fourth aspect of the invention relates to a program stand on a non-transiting medium, which, when executed by a controller of a delivery device, commands the control unit to carry out a method as described above and below.

The program may be a part of another computer program. Furthermore, the program may also itself be an independent computer program. For example, the program may, as an update, render an already existing computer program capable of carrying out the method according to the invention.

A fifth aspect of the invention relates to a computer-readable medium on which there is stored a program element which, when executed by a control unit of a delivery device, commands the control unit to carry out a method described in the context of the invention.

The computer-readable medium may be regarded as being a memory medium, for example a USB stick, a CD, a DVD, a hard disk or some other non-transiting memory medium. Furthermore, the computer-readable medium may also be designed as a microchip which renders a control unit capable of carrying out the method according to the invention.

The described embodiments relate equally to a delivery device, a vehicle, a method, a program element and a computer-readable medium, even though individual embodiments have been described with regard only to the delivery device, the vehicle, the method, the program element or the computer-readable medium. Synergistic effects may arise from various combinations of the embodiments, even if these are not described below.

Further features, advantages and possible uses of the invention will emerge from the following description of the exemplary embodiments and of the figures. Here, all of the features described and/or illustrated in the figures, individually and in any desired combination, form the subject matter of the invention, even independently of their amalgamation in the individual claims or in the back-references thereof.

DETAILED DESCRIPTION OF THE PRESENTLY PREFERRED EMBODIMENTS

Here, the figures are illustrated schematically and not to scale.

Figure 1:
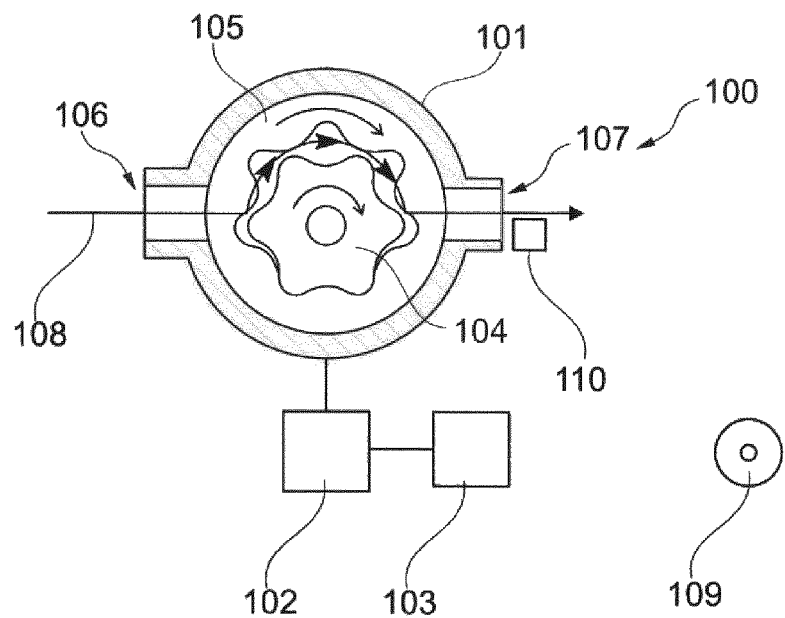
FIG. 1 is a delivery device according to an exemplary embodiment of the invention.
Figure 2:
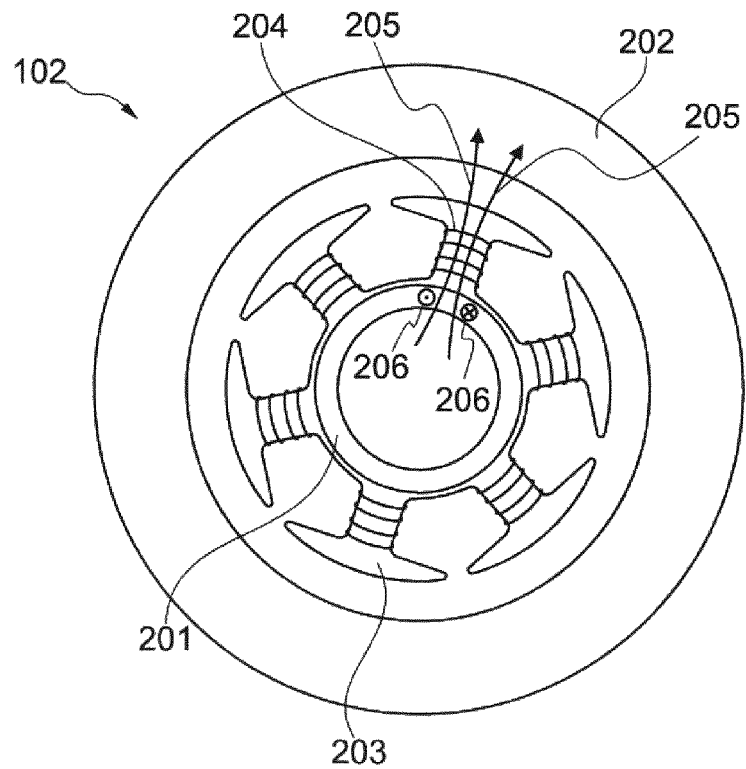
FIG. 2 is an electric motor according to an exemplary embodiment of the invention.

FIG. 1 illustrates a delivery device 100 for delivering a medium and for heating the medium for delivery, as per an exemplary embodiment of the invention. The delivery device 100 has a vehicle pump 101, an electric motor 102 for driving the vehicle pump, and a controller 103 for controlling the electric motor. Here, the electric motor 102 has at least one conductor winding. FIG. 2 illustrates, by way of example, an enlarged view of the electric motor 102 with conductor windings. Furthermore, the controller 103 is designed to generate a first electrical alternating current with a first frequency in the at least one conductor winding, wherein the first electrical alternating current generated in the at least one conductor winding, eddy currents are induced in a component of the delivery device for the purposes of heating the medium.

In the exemplary embodiment shown in FIG. 1, the vehicle pump 101 is designed as a gerotor pump or as a toothed-ring pump. Here, the driving toothed gear 104 runs eccentrically in the internal toothing 105 of the vehicle pump. The toothed gear 104 is driven by the electric motor 102. As a result of the rotation of the toothed gear 104, the medium is conveyed between the tooth spaces, whereby the medium is transported from an inlet 106 of the pump 101 to an outlet 107 of the pump 101 in the arrow direction 108. Here, the gerotor pump in this exemplary embodiment is merely an example and should not be regarded as restrictive. The invention may also be realized for numerous different pump types. Furthermore, the delivery device 101 has a temperature sensor 110 for measuring a temperature of the medium for delivery. The temperature sensor may for example be arranged at an outlet 107 of the vehicle pump 101. Furthermore, the temperature sensor may also be arranged within the pump 101, at the outlet 108 of the pump 101 or at other locations. Using the temperature sensor 110, the temperature of the medium for delivery can be ascertained; if the temperature of the medium for delivery is below a predefined threshold value, then the control unit 103 can generate the first alternating current in the conductor winding of the electric motor 102.

Furthermore, FIG. 1 illustrates a memory medium 109 in which, for example, a method that is carried out by the control unit can be stored. Furthermore, the predefined temperature threshold value may also be stored in the memory unit 109.

FIG. 2 illustrates an electric motor 102 as per an exemplary embodiment of the invention. In this exemplary embodiment, the electric motor 102 is illustrated as an external-rotor motor.

This is however merely an example and should not be regarded as being restrictive. The electric motor may equally be designed as an internal-rotor motor, or may be of some other construction. The stator 201 in this exemplary embodiment comprises six rotor arms 203, which have in each case one conductor winding 204. As already described, the rotor of the electric motor 102 is arranged outside the stator 201 and is constructed for example from a permanently magnetic material. If a current is generated in the conductor windings 204 for the purposes of driving the electric motor, the magnetic fields generated in the conductor windings cause the rotor 202 to rotate about the stator 201. Furthermore, a first electrical alternating current can be generated in the conductor winding 204 by a control unit of the electric motor 102. Said first electrical alternating current generates high-frequency magnetic fields 205, which in turn can induce eddy currents in the iron components or lamination assemblies of the electric motor 102. For example, eddy currents are induced within the stator 201, which eddy currents are arranged in a plane substantially perpendicular to the magnetic fields 205. Said eddy currents in the stator 201 are illustrated by the arrow directions 206. The stator 201 can heat up owing to said eddy currents 206 or owing to remagnetization losses. The stator can release this heat to the medium delivered by the pump 101.

Figure 3:
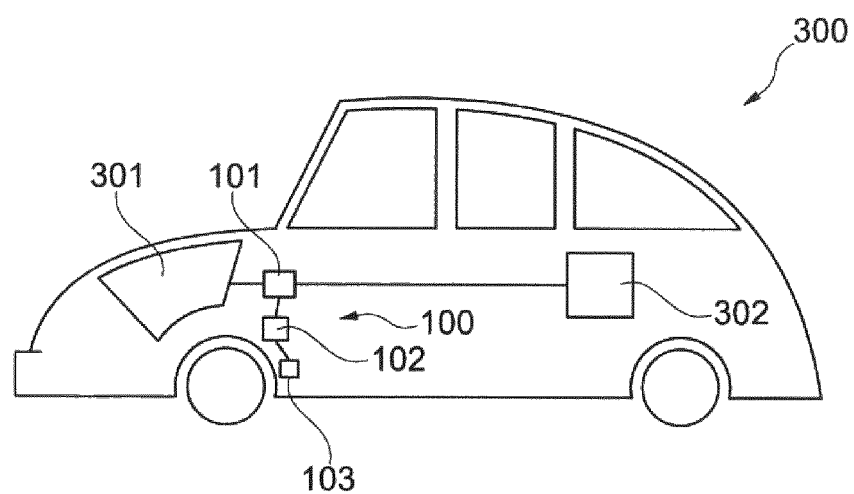
FIG. 3 is a vehicle according to an exemplary embodiment of the invention.

FIG. 3 illustrates a vehicle 300 according to an exemplary embodiment of the invention. The vehicle has an internal combustion engine 301, a fuel tank 302 and a delivery device 100, which supplies fuel from the fuel tank 302 to the internal combustion engine 301. By way of example, the internal combustion engine 301 is a diesel engine. The delivery device 100 comprises a vehicle pump 101, an electric motor 102 for driving the pump and a control unit 103 for controlling the electric motor 102. Here, the control unit 103 may for example be a structural unit of the delivery device 100 or else part of the engine controller of the internal combustion engine 301. Furthermore, the control unit 103 may also have been retrofitted in the vehicle.

Figure 4:
FIG. 4 is a flow diagram of a method according to an exemplary embodiment of the invention.

FIG. 4 illustrates a flow diagram of a method for heating a medium for delivery by a delivery device, which has a vehicle pump, driven by an electric motor, for delivering the medium, according to an exemplary embodiment of the invention. Here, the method comprises the step S1 of generating a first electrical alternating current with a first frequency in at least one conductor winding of the electric motor, wherein by means of the first electrical alternating current generated in the at least one conductor winding, eddy currents are induced in a component of the delivery device, whereby the medium is heated.

It is additionally pointed out that the expressions "comprising" or "having" do not exclude other elements, and the expressions "a" or "an" do not rule out a multiplicity. It is also pointed out that features that have been described with reference to one of the above exemplary embodiments or embodiments may also be used in combination with other features of other above-described exemplary embodiments or embodiments. Reference designations in the claims are not to be regarded as being restrictive.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A delivery device configured to deliver and heat a medium for delivery, comprising:
   a vehicle pump;
   an electric motor configured to drive the vehicle pump and having at least one conductor winding;
   a controller configured to control the electric motor and generate a first electrical alternating current with a first frequency in the at least one conductor winding;
   wherein eddy currents are induced in a component of the delivery device that generate a nonrotating magnetic field to heat the medium by the first electrical alternating current generated in the at least one conductor winding; and a temperature sensor configured to measure a temperature of the medium for delivery;

wherein the controller is configured to generate the first electrical alternating current in the at least one conductor winding when the temperature of the medium to be delivered as measured by the temperature sensor differs from a predefined temperature threshold value stored in a memory.

2. The delivery device as claimed in claim 1, wherein the electric motor has a rotor and a stator;

wherein the at least one conductor winding is arranged on the stator; and wherein the component of the delivery device is the stator of the electric motor.

3. The delivery device as claimed in claim 1, wherein the controller is configured to generate a second electrical alternating current with a second frequency in the at least one conductor winding to drive the electric motor; and wherein the second electrical alternating current generates a rotating field in the electric motor.

4. The delivery device as claimed in claim 1, wherein the first frequency is between 500 Hz and 50 kHz.

5. The delivery device as claimed in claim 1, wherein the controller is configured to detect a blockage of the electric motor; and wherein the controller is configured to generate the first electrical alternating current when the controller detects the blockage of the electric motor and the temperature of the medium is less than a predefined temperature threshold value.

6. A vehicle comprising a delivery device configured to deliver and heat a medium for delivery, having:

a vehicle pump;

an electric motor configured to drive the vehicle pump and having at least one conductor winding;

a controller configured to control the electric motor and generate a first electrical alternating current with a first frequency in the at least one conductor winding;

wherein eddy currents are induced in a component of the delivery device that generate a nonrotating magnetic field to heating the medium by the first electrical alternating current generated in the at least one conductor winding, and wherein the vehicle pump is a fuel pump for delivering fuel for an internal combustion engine, or a urea solution pump; and a temperature sensor configured to measure a temperature of the medium for delivery;

wherein the controller is configured to generate the first electrical alternating current in the at least one conductor winding when the temperature of the medium to be delivered as measured by the temperature sensor differs from a predefined temperature threshold value stored in a memory.

7. A method for delivering and heating a medium by a delivery device having a pump that is driven by an electric motor, the method comprising:

activating the pump to deliver the medium;

generating a first electrical alternating current with a first frequency in at least one conductor winding of the electric motor;

inducing eddy currents in a component of the delivery device that generate a nonrotating magnetic field using the first electrical alternating current generated in the at least one conductor winding, whereby the medium is heated; and measuring a temperature of the medium for delivery;

generating the first electrical alternating current in the at least one conductor winding when the temperature of the medium to be delivered as measured by the temperature sensor differs from a predefined temperature threshold value stored in a memory.

8. A program stored on a non-transitory computer readable medium which, when executed by a controller of a delivery device, commands the controller to:

activate a pump of the delivery device to deliver a medium;

generate a first electrical alternating current with a first frequency in at least one conductor winding of an electric motor of the delivery device that drives the pump;

induce eddy currents in a component of the delivery device that generate a nonrotating magnetic field using the first electrical alternating current generated in the at least one conductor winding, whereby the medium is heated;

measure a temperature of the medium for delivery; and generate the first electrical alternating current in the at least one conductor winding when the temperature of the medium to be delivered as measured by the temperature sensor differs from a predefined temperature threshold value stored in a memory.

9. A nontransitory computer-readable medium on which there is stored a program element which, when executed by a controller of a delivery device, commands the controller to:

activate a pump of the delivery device to deliver a medium;

generate a first electrical alternating current with a first frequency in at least one conductor winding of an electric motor of the delivery device that drives the pump; and induce eddy currents that generate a non-rotating magnetic field in a component of the delivery device using the first electrical alternating current generated in the at least one conductor winding, whereby the medium is heated;

measure a temperature of the medium for delivery; and generate the first electrical alternating current in the at least one conductor winding when the temperature of the medium to be delivered as measured by the temperature sensor differs from a predefined temperature threshold value stored in a memory.

* * * * *